G. E. PAULSEN.
FISH HOOK.
APPLICATION FILED JUNE 2, 1916.

1,215,697. Patented Feb. 13, 1917.

Witnesses
Arthur K. Moore

Inventor
G. E. Paulsen
By
Attorneys

UNITED STATES PATENT OFFICE.

GEORGE E. PAULSEN, OF CHICAGO, ILLINOIS.

FISH-HOOK.

1,215,697.  Specification of Letters Patent.  Patented Feb. 13, 1917.

Application filed June 2, 1916. Serial No. 101,360.

*To all whom it may concern:*

Be it known that I, GEORGE E. PAULSEN, a citizen of the United States, residing at Chicago, in the county of Cook, State of Illinois, have invented certain new and useful Improvements in Fish-Hooks; and I do hereby declare the following to be a full, clear, and exact description of the invention, such as will enable others skilled in the art to which it appertains to make and use the same.

The present invention is directed to improvements in fish hooks, and has for its object to provide a device of this character so constructed that the hooks can be held in contracted positions, and will spring apart when engaged in the mouth of the fish so that the hooks will be caught at different points in the mouth so as to positively prevent the fish from pulling off the hook.

A further object of the invention is to provide a hook of the spring type constructed in such a manner that the hooks thereof can be held under tension, and will spread when disengaged by the fish when taking the hook.

With these and other objects in view, this invention resides in the novel features of construction, formation, combination and arrangement of parts to be hereinafter more fully described, claimed and illustrated in the accompanying drawing, in which:—

Figure 1:
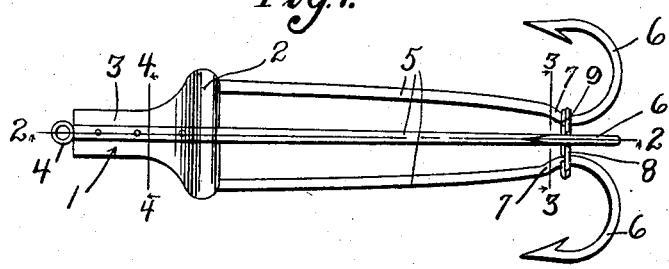
Figure 1 is a side elevation of the device.
Figure 2:
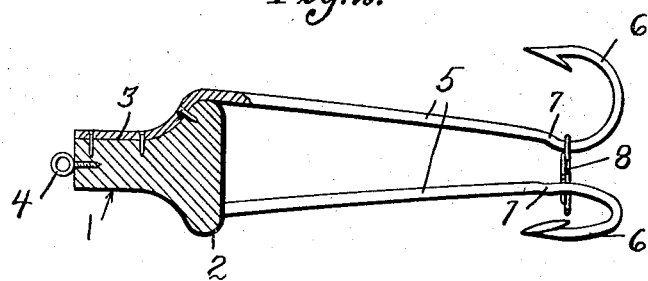
Fig. 2 is a sectional view on line 2—2 of Fig. 1.
Figure 3:
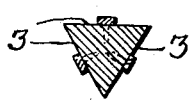
Fig. 3 is a sectional view on line 3—3 of Fig. 1.
Figure 4:
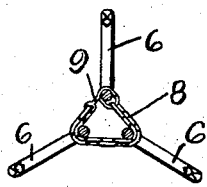
Fig. 4 is a sectional view on line 4—4 of Fig. 1.

Referring to the drawing 1 indicates the head which is formed from any suitable material, and is provided with an annular shoulder 2, said head being triangular in cross section so as to provide faces 3. A screw eye 4 is secured to the upper end of the head so that the line can be actuated thereto. To the faces 3 are secured the upper ends of the shanks 5 of the hooks 6, said shanks may be secured to the plates in any suitable manner.

The lower ends of the shanks are offset, as at 7 whereby the chain 8 when engaged with the hooks will be prevented from sliding upwardly or downwardly thereon. The chain has one of its ends fixed to one of the hooks, and has the other end provided with a hook 9 which is adapted to engage another hook so as to hold the shanks 5 under tension.

It will be of course understood that the shanks 5 are grasped and are forced inwardly after which the chain 8 is engaged therearound so as to hold the shanks 5 under tension. By providing the annular shoulder 2 it is obvious that when the chain 8 is released that the spreading movement of the shanks 5 will be considerable so as to insure positive engagement of the hooks with the mouth of the fish.

It is obvious that when the fish first takes the hooks that the hook 9 will become disengaged and will permit the shanks 5 to spread radially.

What is claimed is:—

A fish hook of the class described comprising a head, said head having a plurality of angularly disposed faces, an annular shoulder carried by the head, fish hooks having the upper ends of their shanks connected to the faces and engaged with the shoulder, and a chain having one end fixed to one of the hooks and its other end detachably engaged with another hook, said chain being engaged around the hooks to hold the shanks under tension.

In testimony whereof, I affix my signature, in the presence of two witnesses.

GEORGE E. PAULSEN.

Witnesses:
 MERRITT O. HOOVER,
 GEO. A. STOKES.

Copies of this patent may be obtained for five cents each, by addressing the "Commissioner of Patents, Washington, D. C."